(12) United States Patent
Kim et al.

(10) Patent No.: US 8,004,238 B2
(45) Date of Patent: Aug. 23, 2011

(54) APPARATUS FOR BALANCING OF BATTERY PACK HAVING FUNCTION OF PREVENTION OF OVER-DISCHARGE

(75) Inventors: Ju-Young Kim, Daejeon (KR); Do-Yang Jung, Daejeon (KR); Do-Youn Kim, Daejeon (KR); Ju-Hyun Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/815,780

(22) Filed: Jun. 15, 2010

(65) Prior Publication Data

US 2010/0253287 A1 Oct. 7, 2010

Related U.S. Application Data

(63) Continuation of application No. PCT/KR2009/002843, filed on May 28, 2009.

(30) Foreign Application Priority Data

| | | |
|---|---|---|
| May 28, 2008 | (KR) | 10-2008-0049807 |
| May 25, 2009 | (KR) | 10-2009-0045588 |
| May 27, 2009 | (KR) | 10-2009-0046650 |

(51) Int. Cl.
*H02J 7/00* (2006.01)
(52) U.S. Cl. ......... 320/118; 320/119; 320/125
(58) Field of Classification Search ......... 320/118, 320/119, 125
See application file for complete search history.

(56) References Cited

U.S. PATENT DOCUMENTS

| | | | | |
|---|---|---|---|---|
| 4,617,496 | A  * | 10/1986 | Samodovitz | 315/208 |
| 6,426,857 | B1 * | 7/2002  | Doster et al. | 361/84 |
| 6,661,198 | B2 * | 12/2003 | Furukawa | 320/118 |
| 6,731,116 | B2 * | 5/2004  | Yamamoto et al. | 324/522 |
| 2005/0017682 | A1 | 1/2005 | Canter et al. | |
| 2008/0090133 | A1* | 4/2008 | Lim et al. | 429/50 |

FOREIGN PATENT DOCUMENTS

| | | |
|---|---|---|
| JP | 2000-228830 A | 8/2000 |
| KR | 10-2003-0021665 A | 3/2003 |
| KR | 10-0778414 B1 | 11/2007 |

* cited by examiner

*Primary Examiner* — Edward Tso
*Assistant Examiner* — Samuel Berhanu
(74) *Attorney, Agent, or Firm* — Birch, Stewart, Kolasch & Birch, LLP

(57) ABSTRACT

An apparatus balances a charging voltage of each battery cell of a battery pack. The apparatus includes a discharge resistor installed on a conductive line connected to both ends of a battery cell in parallel; a balance signal relay unit for relaying a charging voltage of the battery cell according to a balance control signal; and a discharge switching unit for receiving the relayed charging voltage of the battery cell as a driving voltage and connecting the battery cell to the discharge resistor to discharge the battery cell if the driving voltage is over an effective voltage level. This apparatus prevents overcharging of a battery cell, caused by a failure of a control processor, while balancing a charging voltage of battery cells. Also, the control processor may be protected against an electric impact by electrical insulation from a discharge circuit. Accordingly, the safety of the battery pack is improved.

10 Claims, 3 Drawing Sheets

APPARATUS FOR BALANCING OF BATTERY PACK HAVING FUNCTION OF PREVENTION OF OVER-DISCHARGE

This application is a continuation of co-pending PCT/KR2009/002843 filed on May 28, 2009, which claims priority under 35 U.S.C. 119(a) to patent application Ser. No(s). 10-2008-0049807 filed in Korea on May 28, 2008, 10-2009-0045588 filed in Korea on May 25, 2009, and 10-2009-0046650 filed in Korea on May 27, 2009, all of which are hereby expressly incorporated by reference into the present application.

TECHNICAL FIELD

The present invention relates to an apparatus for balancing a battery pack, and more particularly to an apparatus for balancing a battery pack with an overdischarge prevention function, which may prevent a cell from being overdischarged due to a failure of a control processor while balancing a charging voltage of each battery cell included in a battery pack.

BACKGROUND ART

Generally, secondary batteries are classified into nickel-cadmium batteries, nickel-hydrogen batteries, lithium ion batteries, lithium ion polymer batteries and so on. Such secondary batteries are also classified into lithium-based batteries and nickel-hydrogen-based batteries. The lithium-based batteries are generally applied to small products such as digital cameras, P-DVD, MP3P, cellular phones, PDA, portable game devices, power tools and E-bikes, and the nickel-hydrogen-based batteries are generally applied to large products such as electric vehicles and hybrid vehicles, which require high power.

Meanwhile, an electric or hybrid vehicle should operate a motor requiring high power in order to move. For this purpose, a battery employed in the electric or hybrid vehicle uses as a power source an electricity output from a battery pack in which a plurality of battery cells are connected in series.

The plurality of battery cells included in the battery pack should keep their voltages uniformly in order to ensure stability, long life span and high power. An electric vehicle has a plurality of battery packs, each having a plurality of battery cells, and a battery management system (BMS) keeps each battery cell to a suitable voltage level while charging or discharging each battery cell of the battery pack. However, the plurality of battery cells may not be easily kept in an equivalent state due to various factors such as the change of internal impedance, so the BMS performs an operation for controlling the plurality of battery cells into an equivalent state.

In order to control the battery cells in a high voltage battery pack to have uniform voltages, a semiconductor switch was conventionally used to selectively connect a discharge resistor (or, a Buck resistor) to a battery cell whose voltage is higher than an average voltage, thereby exhausting the energy possessed by the battery cell and thus decreasing a voltage difference between battery cells.

In order to ensure safety while balancing the plurality of battery cells, if a voltage of a battery cell to be discharged is lowered to a certain voltage level, it is important to cut the connection between a discharge circuit and the corresponding battery cell. However, in some cases, the connection between the battery cell and the discharge circuit may not be cut at a proper time due to a failure of a control processor controlling the discharge of each battery cell or an error of a program algorithm. In this case, current is slightly discharged from the battery cell continuously, so the battery may come to an overdischarged state. If the battery cell is overdischarged, various dangers may occur. In particular, when coming to an overdischarged state, a lithium ion battery pack may cause serious problems, such as explosion.

DISCLOSURE

Technical Problem

The present invention is designed to solve the problems of the prior art, and therefore it is an object of the present invention to provide an apparatus for balancing a battery pack having an overdischarge prevention function, which may prevent the battery pack from being continuously discharged due to a failure of a control processor while a discharge current is flowing to balance a charging voltage of battery cells.

Technical Solution

In order to accomplish the above object, the present invention provides an apparatus for balancing a battery pack having an overdischarge prevention function, which balances a charging voltage of each battery cell of a battery pack that includes a plurality of battery cells, the apparatus including a discharge resistor installed on a conductive line connected to both ends of a battery cell in parallel; a balance signal relay unit for relaying a charging voltage of the corresponding battery cell according to a balance control signal; and a discharge switching unit for receiving the charging voltage of the battery cell, relayed from the balance signal relay unit, as a driving voltage, the discharge switching unit connecting the battery cell to the discharge resistor to discharge the battery cell in case the driving voltage is over an effective voltage level.

Preferably, the balance control signal is a pulse signal in which high-level signals and low-level signals are repeated at a predetermined frequency or a high-level signal of a DC signal pattern.

Preferably, the balance signal relay unit is a photo coupler, and the balance signal relay unit includes a light emitting element and a light receiving element. The light emitting element receives the balance control signal to convert the high-level signal of the balance control signal into a photo signal, and the light receiving element is connected between the battery cell and the discharge switching unit and relays the charging voltage of the battery cell to the discharge switching unit when the photo signal is applied thereto from the light emitting element.

Preferably, the discharge switching unit is a field effect transistor (FET), and the field effect transistor includes a source terminal connected to one of the battery cell, a drain terminal connected to the other end of the battery cell via the discharge resistor, and a gate terminal connected to the balance signal relay unit.

Preferably, the effective voltage level at which current initiates to flow between the source terminal and the drain terminal of the field effect transistor is in a voltage level over an overdischarge threshold voltage of the battery cell.

Preferably, the apparatus further includes a controller for measuring charging voltages of the plurality of battery cells included in the battery pack to select a battery cell that requires balancing, and applying a balance control signal to a balance signal relay unit connected to the selected battery cell to operate the balance signal relay unit.

In another aspect of the present invention, there is also provided an apparatus for balancing a battery pack having an overdischarge prevention function, which balances a charging voltage of each battery cell of a battery pack that includes a plurality of battery cells, the apparatus including a discharge resistor installed on a conductive line connected to both ends of a battery cell in parallel; a charge pump for pumping charges only when a balance control signal of a predetermined frequency is input thereto; a discharge switching unit for connecting the battery cell to the discharge resistor when a driving voltage of an effective voltage level is applied thereto such that the battery cell is discharged; and a voltage charging unit for charging the pumped charges to apply the charging voltage as the driving voltage of the discharge switching unit.

Preferably, the voltage charging unit includes a discharge resistor for discharging a charging voltage, and the charge pump pumps charges under the condition that an increasing rate of the charging voltage by the charge pumping process is greater than a decreasing rate of the charging voltage by the discharging process.

Selectively, the apparatus may further include a diode provided on a conductive line through which the balance control signal is applied to the charge pump, the diode preventing noise from being introduced to the charge pump.

As an alternative, the apparatus may further include a balance signal relay unit installed on a conductive line through which the balance control signal is applied to the charge pump, the balance signal relay unit periodically relaying high-level voltage signals and low-level voltage signals to the charge pump according to the balance control signal having a predetermined frequency output from a controller. At this time, the balance signal relay unit may be a photo coupler, and the balance signal relay unit may include a light emitting element and a light receiving element. The light emitting element receives the balance control signal to convert the high-level signal of the balance control signal into a photo signal, and the light receiving element is connected between the battery cell and the charge pump and relays the charging voltage of the battery cell to the charge pump at a predetermined frequency when the photo signal is applied thereto from the light emitting element.

Preferably, the effective voltage level at which current initiates to flow between the source terminal and the drain terminal of the field effect transistor is smaller than a charging capacity of the voltage charging unit.

Advantageous Effects

According to the present invention, it is possible to prevent a battery cell from being overdischarged due to a failure of a control processor while balancing a charging voltage of battery cells. In addition, the control processor may be protected against an electric impact by electrically insulating the control processor from a discharge circuit that balances battery cells. Accordingly, it is possible to improve the safety of the battery pack.

DESCRIPTION OF DRAWINGS

Other objects and aspects of the present invention will become apparent from the following description of embodiments with reference to the accompanying drawing in which.

REFERENCE NUMERAL OF ESSENTIAL PARTS IN THE DRAWINGS

Figure 1:
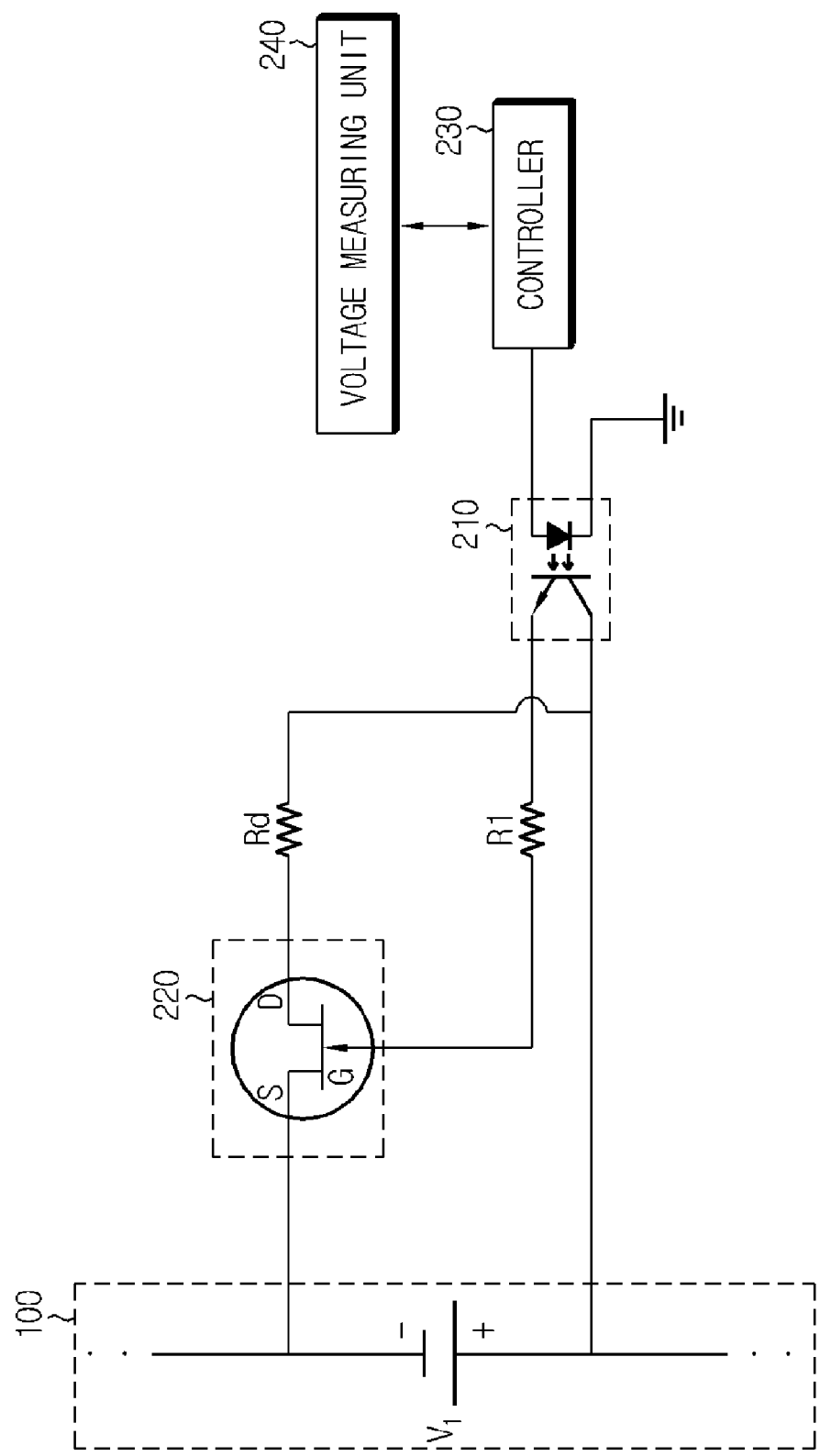
FIG. 1 is a schematic circuit diagram showing an apparatus for balancing a battery pack having an overdischarge prevention function according to a first embodiment of the present invention.

100: battery pack 210: balance signal relay unit
220: discharge switching unit 230: controller
240: voltage measuring unit 250: charge pump
260: voltage charging unit

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

FIG. 1 is a schematic circuit diagram showing an apparatus for balancing a battery pack having an overdischarge prevention function according to a first embodiment of the present invention.

Referring to FIG. 1, the apparatus for balancing a battery pack according to the first embodiment of the present invention includes a balance signal relay unit 210, a discharge switching unit 220, a discharge resistor $R_d$, a controller 230 and a voltage measuring unit 240.

The balance signal relay unit 210, the discharge switching unit 220 and the discharge resistor $R_d$ are individually connected to a plurality of battery cells in parallel and discharge a battery cell that needs balancing such that a charging voltage of the battery cell comes to a target balancing voltage.

The balance signal relay unit 210 is preferably a photo coupler that is electrically insulated from the controller 230 and performs an on/off operation according to a balance control signal output from the controller 230. The balance control signal is a pulse signal in which high-level signals and low-level signals are repeated at regular frequencies, or a high-level signal having a DC signal pattern. If the balance control signal is applied to the balance signal relay unit 210, the balance signal relay unit 210 is operated to initiate balancing of a battery cell $V_1$.

The photo coupler includes a light emitting element and a light receiving element, which are electrically insulated from each other. The light emitting element is connected to the controller 230 to generate a photo signal according to a balance control signal applied from the controller 230. If the balance control signal is a pulse signal with a regular frequency, the light emitting element generates a photo signal only in a high-level signal region. If a photo signal is generated from the light emitting element, the light receiving element relays the charging voltage of the battery cell $V_1$ to the discharge switching unit 220. Meanwhile, a resistor $R_1$ is interposed between the discharge switching unit 220 and the balance signal relay unit 210, and the resistor $R_1$ is an inherent resistor component of a circuit line connecting the discharge switching unit 220 and the balance signal relay unit 210.

The discharge switching unit 220 is installed on a conductive line connected to both ends of the battery cell $V_1$ in parallel to switch the connection between the battery cell $V_1$ and the discharge resistor $R_d$. Preferably, the discharge switching unit 220 is an field effect transistor having a source terminal S, a drain terminal D and a gate terminal G.

The discharge switching unit 220 and the battery cell $V_1$ configure a closed-loop circuit via the balance signal relay unit 210. A driving voltage for operating the discharge switching unit 220 is a charging voltage of the battery cell $V_1$ applied to the discharge switching unit 220 by the operation of the balance signal relay unit 210. In other words, the source terminal S of the discharge switching unit 220 is connected to one end of the battery cell $V_1$, the drain terminal D is connected to the other end of the battery cell $V_1$ via the discharge resistor $R_d$, and the gate terminal G is connected to the balance signal relay unit 210. Thus, if the balance signal relay unit 210 is operated, a voltage $V_{gs}$ between the gate terminal and the source terminal of the discharge switching unit 220 becomes substantially identical to the charging voltage of the battery cell $V_1$.

The discharge switching unit 220 is operated as follows. If the controller 230 outputs a balance control signal, a charging voltage of the battery cell $V_1$ is applied as a driving voltage to the gate terminal G of the discharge switching unit 220. At this time, if the voltage applied to the gate terminal G is over an effective voltage level, the voltage $V_{gs}$ between the gate terminal and the source terminal becomes greater than a threshold voltage. Then, the discharge switching unit 220 is turned on to flow a discharging current between the source terminal and the drain terminal, and accordingly the discharge resistor $R_d$ discharges the charging voltage of the battery V1. Meanwhile, if the charging voltage of the battery cell $V_1$ applied to the gate terminal G is smaller than an effective voltage level, the voltage $V_{gs}$ between the gate terminal and the source terminal becomes smaller than a threshold voltage. Then, the discharge switching unit 220 is turned off not to flow a discharging current between the source terminal and the drain terminal. As a result, the discharge resistor $R_d$ does not discharge the charging voltage of the battery cell $V_1$ any more.

In the first embodiment of the present invention, the effective voltage level is preferably a threshold voltage at which the battery cell $V_1$ comes to an overdischarged state. Here, any person having ordinary skill in the art may easily select the discharge switching unit 220 having the overdischarge threshold voltage as an effective voltage level.

According to the first embodiment of the present invention as explained above, in a balancing mode, the voltage $V_{gs}$ between the gate terminal and the source terminal becomes substantially identical to the charging voltage of the battery cell $V_1$. Thus, though the charging voltage of the battery cell $V_1$ is continuously discharged due to the failure of the controller 230, if the charging voltage of the battery cell $V_1$ comes to an overdischarged state, the discharge switching unit 220 is automatically turned off to prevent the battery cell $V_1$ from being overdischarged. It is because the voltage $V_{gs}$ between the gate terminal and the source terminal is decreased lower than the effective voltage level if the battery cell $V_1$ comes to an overdischarged state.

Figure 2:
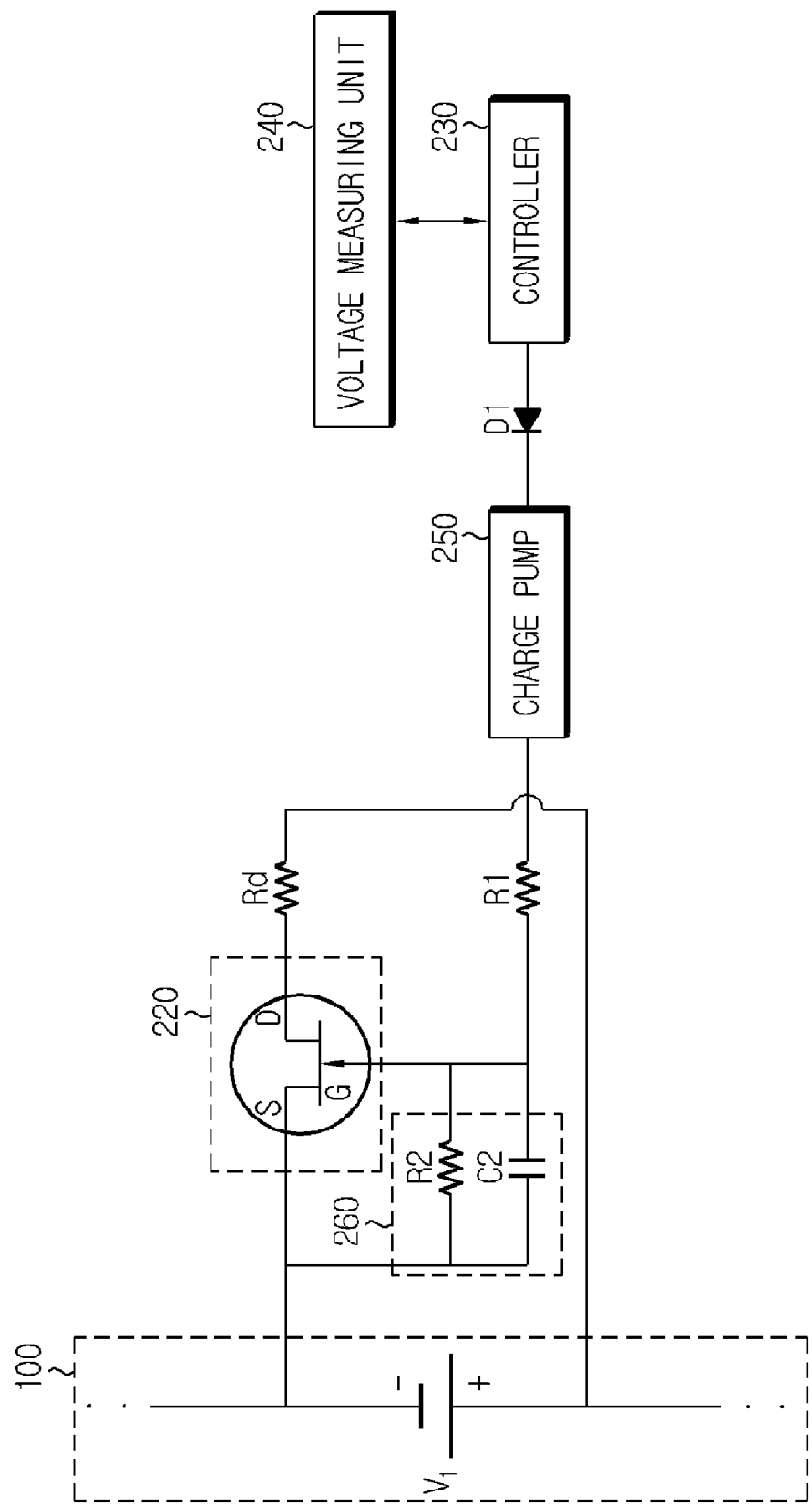
FIG. 2 is a schematic circuit diagram showing an apparatus for balancing a battery pack having an overdischarge prevention function according to a second embodiment of the present invention.

FIG. 2 is a schematic circuit diagram showing an apparatus for balancing a battery pack having an overdischarge prevention function according to a second embodiment of the present invention.

Referring to FIG. 2, the apparatus for balancing a battery pack according to the second embodiment of the present invention further includes a charge pump 250 and a voltage charging unit 260 in addition to the components of the battery pack balancing apparatus of the first embodiment, from which the balance signal relay unit 210 is excluded.

The discharge switching unit 220, the charge pump 250, the voltage charging unit 260 and the discharge resistor $R_d$ are individually connected to a plurality of battery cells in parallel and discharge the battery cells until a charging voltage of a battery cell requiring balancing is discharged to a target balancing voltage.

The voltage charging unit 260 includes a resistor $R_2$ and a capacitor $C_2$. The resistor $R_2$ plays a role of discharging a voltage charged to the capacitor $C_2$, and the capacitor $C_2$ applies the charged voltage to a gate terminal G of the discharge switching unit 220 as a driving voltage.

A resistor $R_1$ is interposed between the voltage charging unit 260 and the charge pump 250, and the resistor is an inherent resistor component on a circuit line connecting the voltage charging unit 260 and the charge pump 250.

The charge pump 250 performs a charge pumping operation if the controller 230 outputs a balance control signal. Also, the charge pump 250 includes a capacitor therein, so it electrically insulates the controller 230 from the battery cell $V_1$.

The charge pumping operation is performed only when the balance control signal output from the controller 230 is changed with a constant frequency, and the charge pumping operation is not performed if the balance control signal has a DC signal pattern. A circuit configuration of such a charge pump 250 having the above operation characteristics is well known in the art, so it is not described in detail here.

In the second embodiment of the present invention, a normal waveform of the balance control signal is preferably a signal pattern in which ON signals of a high level and OFF signals of a low level are repeated with regular frequencies. However, if the controller is operated abnormally, the balance control signal may have a DC signal waveform in which high-level signals or low-level signals are successively kept.

The charge pump 250 pumps a charge to the capacitor $C_2$ included in the voltage charging unit 260 with a regular frequency if a balance control signal having a constant frequency is output from the controller 230. Then, voltages at both ends of the capacitor $C_2$ are increased, and a certain point of time, the driving voltage applied to the gate terminal G of the field effect transistor of the discharge switching unit 220 is increased over an effective voltage level at which the discharge switching unit 220 may be turned on. As a result, as the discharge switching unit 220 is turned on, the discharge resistor $R_d$ and the battery cell $V_1$ are connected in series to flow a discharging current, and according the battery cell $V_1$ is discharged to make a voltage balancing operation.

While the voltage balancing operation is performed, the charges charged to the capacitor $C_2$ of the voltage charging unit 260 are continuously discharged through the resistor $R_2$. Thus, for effective voltage balancing operation, an increased value of the voltage of the capacitor $C_2$ caused by the operation of the charge pump 250 (or, an increasing rate of the charging voltage) is preferably greater than a dropped value of the voltage of the capacitor $C_2$ caused by the discharge of the resistor $R_2$ (or, a decreasing rate of the charging voltage) such that the charging voltage of the capacitor $C_2$ may be kept over an effective voltage level that allows to turn on the discharge switching unit 220. This condition may be satisfied by controlling amplitude, duty ratio or frequency of the balance control signal.

Meanwhile, if an abnormal balance control signal is output due to a failure of the controller 230 or the like, an abnormal signal pattern may be applied to the charge pump 250. For example, a balance control signal having a DC pattern signal waveform, namely successive high-level or low-level signal, may be applied to the charge pump. In this case, the charge pump 250 stops its charge-pumping operation due to inherent characteristics of the charge pump 250. Then, the capacitor $C_2$ of the voltage charging unit 260 is not charged any more, so the charging voltage of the capacitor $C_2$ is lowered below the effective voltage level due to the discharge of the resistor $R_2$, thereby turning off the discharge switching unit 220. From this point, the discharge of the battery cell $V_1$ is intercepted, and the discharge of the resistor $R_2$ is continued until the charging voltage of the capacitor $C_2$ becomes 0 (zero).

In the second embodiment of the present invention, the effective voltage level is determined depending on a charging voltage of the voltage charging unit 260. In other words, the effective voltage level at which current initiates to flow between the source terminal and the drain terminal of the field effect transistor of the discharge switching unit 220 is preferably smaller than a charging capacity of the voltage charging unit 260. Here, it is apparent to those having ordinary skill in the art to select the discharge switching unit 220 having a suitable effective voltage level according to a charging capacity of the voltage charging unit 260.

According to the second embodiment, though an abnormal signal waveform, particularly successive high-level signals, is applied to the charge pump 250 in a balance mode, it is possible to prevent the battery cell $V_1$ from being continuously discharged, and thus to prevent the battery cell $V_1$ from being overdischarged.

Meanwhile, a diode D1 may be selectively interposed between the charge pump 250 and the controller 230. The diode D1 plays a role of rectifying the balance control signal, thereby preventing noise signal from being introduced into the charge pump 250.

According to the present invention, the controller 230 periodically measures a charging voltage of a plurality of battery packs $V_1$ included in a battery pack 100 by means of the voltage measuring unit 240. Such a voltage measuring circuit is well known in the art, and not described in detail here. Also, the controller 230 selects a battery cell that requires balancing, based on the measured voltage value of each battery cell. After that, the controller outputs a balance control signal to the balance signal relay unit 210 or the charge pump 250 corresponding to the selected battery cell such that the charging voltage of the battery cell is balanced according to the first and second embodiments.

Figure 3:
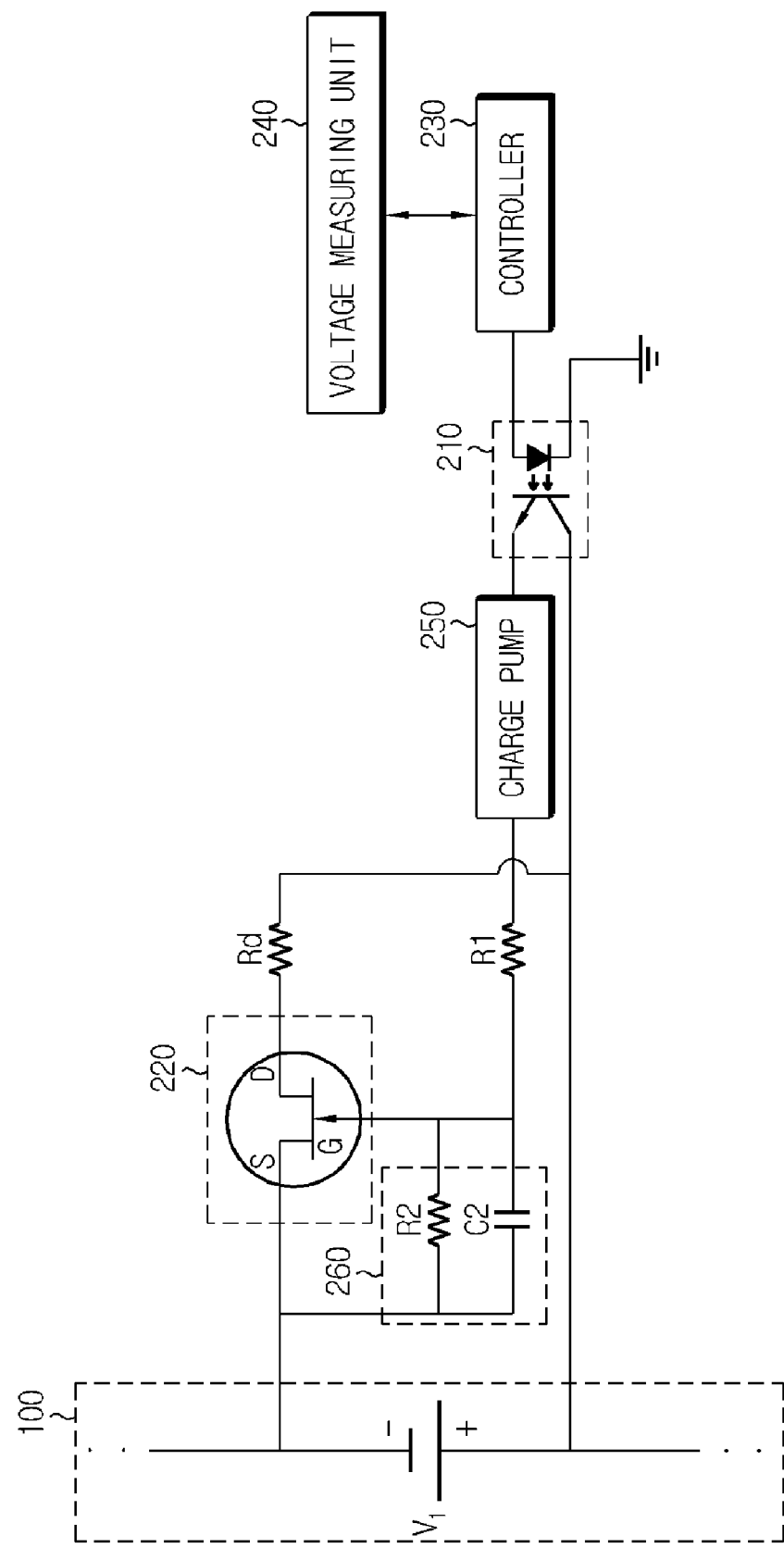
FIG. 3 is a schematic circuit diagram showing an apparatus for balancing a battery pack having an overdischarge prevention function according to a third embodiment of the present invention.

Meanwhile, in the first and second embodiments, it has been explained that the balance signal relay unit 210 and the charge pump 250 are configured individually. However, the present invention is not limited thereto, but the balance signal relay unit 210 and the charge pump 250 may be configured together as shown in FIG. 3 that illustrates a third embodiment of the present invention. In this case, if a balance control signal with a constant frequency is output form the controller 230, the balance signal relay unit 210 may be operated to apply a charging voltage of the battery cell $V_1$ to the charge pump 250 with the same frequency, and the charge pump 250 may be operated in the same way as in the second embodiment to balance a voltage of the battery cell $V_1$.

In addition, if the controller 230 determines that a discharged battery cell reaches a target balancing voltage while periodically measuring a charging voltage of each battery cell, the controller 230 does not output a balance control signal any more to the balance signal relay unit 210 or the charge pump 250. Then, the balancing operation for the corresponding battery cell is ended.

The controller 230 may include a separate memory (not shown) to accumulatively store voltage measurement values output from the voltage measuring unit 240, and also a program algorithm for realizing the charging voltage balancing operation of each battery cell may be recorded in the memory. The controller 230 may select a battery cell requiring balancing by, for example, averaging voltages of every battery cell and then choosing a battery cell having a voltage higher than the average voltage level as much as a certain value. As an alternative, a battery cell having a voltage over a certain value based on a battery cell having a lowest voltage may be selected as a subject for balancing. However, the present invention is not limited to such a battery cell selecting manner.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An apparatus for balancing a battery pack having an overdischarge prevention function, which balances a charging voltage of each battery cell of a battery pack that includes a plurality of battery cells, the apparatus comprising:
a discharge resistor installed on a conductive line connected to both ends of a battery cell in parallel; a charge pump for pumping charges only when a balance control signal of a predetermined frequency is input thereto;
a discharge switching unit for connecting the battery cell to the discharge resistor when a driving voltage of an effective voltage level is applied thereto such that the battery cell is discharged; and a voltage charging unit for charging the pumped charges to apply the charging voltage as the driving voltage of the discharge switching unit, further comprising a balance signal relay unit installed on a conductive line through which the balance control signal is applied to the charge pump, the balance signal relay unit periodically relaying high-level voltage signals and low-level voltage signals to the charge pump according to the balance control signal having a predetermined frequency output from a controller.

2. The apparatus for balancing a battery pack having an overdischarge prevention function according to claim 1,
wherein the voltage charging unit includes a discharge resistor for discharging a charging voltage, and
wherein the charge pump pumps charges under the condition that an increasing rate of the charging voltage by the charge pumping process is greater than a decreasing rate of the charging voltage by the discharging process.

3. The apparatus for balancing a battery pack having an overdischarge prevention function according to claim 1,
wherein the balance control signal is a pulse signal in which high-level signals and low-level signals are repeated at a predetermined frequency.

4. The apparatus for balancing a battery pack having an overdischarge prevention function according to claim 1, further comprising a diode provided on a conductive line through which the balance control signal is applied to the charge pump, the diode preventing noise from being introduced to the charge pump.

5. The apparatus for balancing a battery pack having an overdischarge prevention function according to claim 1,
wherein the balance signal relay unit is a photo coupler.

6. The apparatus for balancing a battery pack having an overdischarge prevention function according to claim 5,
wherein the balance signal relay unit includes a light emitting element and a light receiving element,
wherein the light emitting element receives the balance control signal to convert the high-level signal of the balance control signal into a photo signal, and
wherein the light receiving element is connected between the battery cell and the charge pump, and the light receiving element relays the charging voltage of the battery cell to the charge pump at a predetermined frequency when the photo signal is applied thereto from the light emitting element.

7. The apparatus for balancing a battery pack having an overdischarge prevention function according to claim 1,
wherein the discharge switching unit is a field effect transistor (FET).

8. The apparatus for balancing a battery pack having an overdischarge prevention function according to claim 7,
wherein the field effect transistor includes a source terminal connected to one of the battery cell, a drain terminal connected to the other end of the battery cell via the discharge resistor, and a gate terminal connected to the voltage charging unit.

9. The apparatus for balancing a battery pack having an overdischarge prevention function according to claim 8,
wherein the effective voltage level at which current initiates to flow between the source terminal and the drain terminal of the field effect transistor is smaller than a charging capacity of the voltage charging unit.

10. The apparatus for balancing a battery pack having an overdischarge prevention function according to claim 1, further comprising a controller for measuring charging voltages of the plurality of battery cells included in the battery pack to select a battery cell that requires balancing, and applying the balance control signal to a charge pump connected to the selected battery cell to operate the charge pump.

* * * * *